US012579449B2

(12) United States Patent
Anifowose et al.

(10) Patent No.: US 12,579,449 B2
(45) Date of Patent: Mar. 17, 2026

(54) HYDROCARBON OIL FRACTION PREDICTION WHILE DRILLING

(71) Applicant: SAUDI ARABIAN OIL COMPANY, Dhahran (SA)

(72) Inventors: Fatai A. Anifowose, Al-Khobar (SA); Mokhles M. Mezghani, Dhahran (SA); Vladislav Torlov, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1165 days.

(21) Appl. No.: 17/173,148

(22) Filed: Feb. 10, 2021

(65) Prior Publication Data

US 2022/0253726 A1    Aug. 11, 2022

(51) Int. Cl.
G06N 5/04 (2023.01)
E21B 49/08 (2006.01)
G06N 20/00 (2019.01)

(52) U.S. Cl.
CPC ............. G06N 5/04 (2013.01); E21B 49/088 (2013.01); G06N 20/00 (2019.01); *E21B 2200/20* (2020.05)

(58) Field of Classification Search
CPC .... E21B 33/00; E21B 49/088; E21B 2200/20; E21B 2200/22; E21B 49/005; G06N 3/0895; G06N 3/09; G06N 3/091; G06N 3/092; G06N 3/094; G06N 3/096; G06N 3/098; G06N 3/0985; G06N 5/04; G06N 20/00; G06N 3/08; G01N 33/2823
See application file for complete search history.

(56) References Cited

U.S. PATENT DOCUMENTS

| | | | |
|---|---|---|---|
| 9,262,713 B2 | 2/2016 | Shelley et al. | |
| 9,347,314 B2 | 5/2016 | Indo et al. | |
| 2003/0075361 A1* | 4/2003 | Terry ................... | E21B 17/206 |
| | | | 175/171 |
| 2005/0256646 A1* | 11/2005 | Ellis ................... | G01N 33/2823 |
| | | | 702/9 |
| 2011/0088895 A1 | 4/2011 | Pop et al. | |

(Continued)

FOREIGN PATENT DOCUMENTS

| | | |
|---|---|---|
| CN | 103615242 B | 8/2016 |
| WO | 2020185094 A1 | 9/2020 |

OTHER PUBLICATIONS

Soumi Chaki "Reservoir Characterization: A Machine Learning Approach," https://arxiv.org/abs/1506.05070, (Year: 2015).*

(Continued)

*Primary Examiner* — David Yi
*Assistant Examiner* — Nicholas Shine
(74) *Attorney, Agent, or Firm* — Osha Bergman Watanabe & Burton LLP

(57) ABSTRACT

A method includes building a mud-gas hydrocarbon oil fraction database comprising historical data, training a machine learning model using the historical data in the mud-gas hydrocarbon oil fraction database, drilling a new wellbore, processing drilling mud returns, from the new wellbore, through a gas sampler comprising a gas chromatograph and a gas mass spectrometer, retrieving real-time mud-gas data from the gas sampler, and generating a real-time hydrocarbon oil fraction log for the new wellbore by processing the real-time mud-gas data through the trained machine learning model and producing estimated hydrocarbon oil fraction data.

12 Claims, 8 Drawing Sheets

(56)                    References Cited

U.S. PATENT DOCUMENTS

| | | | |
|---|---|---|---|
| 2014/0067353 A1* | 3/2014 | Shelley | G06N 3/042 |
| | | | 703/10 |
| 2021/0062650 A1* | 3/2021 | Molla | E21B 49/086 |
| 2021/0110280 A1* | 4/2021 | Akkurt | G06N 5/04 |
| 2021/0350208 A1* | 11/2021 | Wang | G06N 3/08 |
| 2022/0091090 A1* | 3/2022 | Baecker | G01N 33/2823 |

OTHER PUBLICATIONS

Abouelresh, Mohamed O., "Quantitative and Qualitative Evaluation of Micro-Porosity in Qusaiba Hot Shale, Saudi Arabia", URTeC: 2154081, Unconventional Resources Technology Conference, Jul. 2015, pp. 1-10 (10 pages).

Alakeely, Adbullah et al., "Application of Artificial Intelligence for Fluid Typing using Calibrated Compositional Data", Search and Discovery Article #41325, Apr. 2014 (25 pages).

Beda, Giulia and Devendra Tiwary, "An Innovative Approach for Estimating the Sw and Porosity Using Gas and Mud Logging Data in Real Time", Search and Discovery Article #40824, Oct. 2011 (17 pages).

Beda, G. et al., "Gas While Drilling (GWD); A Real Time Geologic and Reservoir Interpretation Tool", Transactions of the SPWLA Annual Logging Symposium 40, 1999, pp. 1-14 (14 pages).

Dashti, Jalal et al., "Use of Advanced Mud Gas Chromatography for Reservoir Quality Prediction While Drilling", PTC-18624-MS, International Petroleum Technolgy Conference, Nov. 2016, pp. 1-17 (17 pages).

Dashti, Jalal et al., "Use of Mud Gas Chromatograph for Reservoir Quality Prediction While Drilling—A Case Study", SPE-175268-MS, Society of Petroleum Engineers, Oct. 2015, pp. 1-17 (17 pages).

Erzinger, Jorg et al., "Real-time mud gas logging during drilling of the SAFOD Pilot Hole in Parkfield, CA", Geophysical Research Letters, vol. 31, L13S18, Jun. 2004, pp. 1-4 (4 pages).

Hammerschmidt, Sebastian B. et al., "Real-time drilling mud gas monitoring for qualitative evaluation of hydrocarbon gas composition during deep sea drilling in the Nankai Trough Kumano Basin", Geochemical Transactions, vol. 15, No. 15, 2014, pp. 1-15 (15 pages).

Haworth, J.H. et al., "Interpretation of Hydrocarbon Shows Using Light (C1-C5) Hydrocarbon Gases from Mud-Log Data", The American Association of Petroleum Geologists Bulletin, vol. 69, No. 8, Aug. 1985, pp. 1305-1310 (6 pages).

Hurst, Andrew et al., "Predicting Reservoir Characteristics From Drilling and Hydrocarbon-Gas Data Using Advanced Computational Mathematics", SPE 123785, Society of Petroleum Engineers, Sep. 2009, pp. 1-10 (10 pages).

Melo, Bruno Alexandre de Oliveira, "Formation fluid prediction through gas while drilling analysis: Relationship between mud gas data and downhole fluid samples", Técnico Lisboa, Feb. 2016 (89 pages).

Monsen, E. et al., "Quantitative 3D outcrop interpretation", SEG/New Orleans 2006 Annual Meeting, pp. 1043-1047 (5 pages).

Moore, William R. et al., "Uncertainty Analysis in Well-Log and Petrophysical Interpretations", Uncertainty analysis and reservoir modeling: AAPG Memoir 96, The American Association of Petroleum Geologists, 2011, pp. 17-28 (12 pages).

Saidian, Milad et al., "Qualitative and Quantitative Reservoir Bitumen Characterization: A Core to Log Correlation Methodology", SPWLA 55th Annual Logging Symposium, May 2014, pp. 1-20 (20 pages).

Serra, O., "2. Logging Techniques and Measurements: 1 The Aquisition of Logging Data", Fundamentals of Well-Log Interpretation, Developments in Petroleum Science 15A, Elsevier Science Publishers B.V., 1984, pp. 29-50 (22 pages).

Torlov, Vladislav S. et al., "Utilization of Mud Logs for Oil Fraction Quantification in Transition Zones and Low Resistivity Reservoirs", SPE-197403-MS, Society of Petroleum Engineers, Nov. 2019, pp. 1-16 (16 pages).

Yang, Tao et al., "A Machine Learning Approach to Predict Gas Oil Ratio Based on Advanced Mud Gas Data", SPE-195459-MS, Society of Petroleum Engineers, Jun. 2019, pp. 1-17 (17 pages).

* cited by examiner

HYDROCARBON OIL FRACTION PREDICTION WHILE DRILLING

BACKGROUND

Hydrocarbon fluids are often found in hydrocarbon reservoirs located in porous rock formations below the earth's surface. Wells are often drilled into hydrocarbon reservoirs to extract the hydrocarbon fluids. A hydrocarbon oil fraction is a rock property that provides the proportion of hydrocarbon fluids to rock. The hydrocarbon oil fraction is an important indicator as to whether or not a porous rock formation comprises a significant amount of hydrocarbon fluids. The hydrocarbon oil fraction also provides an indication as to where wells should be drilled and as to what portion of the well should be completed or stimulated.

Currently, the hydrocarbon oil fraction is determined after a well or a wellbore section has been drilled. The hydrocarbon oil fraction is computed from well logs produced during wireline operations, and wireline operations are completed after a well or a section of wellbore has been drilled. The ability to estimate the hydrocarbon oil fraction while drilling a new wellbore is beneficial as the real-time data provides important information about the wellbore such as if the wellbore should be continued, in which direction should the wellbore be drilled, and if the wellbore warrants future logging or analysis. Accordingly, a need exists for a system with the ability to accurately estimate the hydrocarbon oil fraction while drilling a new wellbore.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a system and method of use of the system to produce a hydrocarbon oil fraction log for a new wellbore. In general, and in one embodiment, the system comprises a machine learning model, a computer processor with a memory for storing the machine learning model, and a drilling system. The drilling system further comprises a new wellbore, drilling mud returns, and a gas sampler. The gas sampler comprises a gas chromatograph and a gas mass spectrometer to processes the drilling mud returns from the new wellbore. The machine learning model is trained using a mud-gas hydrocarbon oil fraction database comprising historical data. The computer processor retrieves real-time mud-gas data from the gas sampler and the machine learning model generates, using the real-time mud-gas data, a real-time hydrocarbon oil fraction log for the new wellbore.

In further embodiments, a method for generating a real-time hydrocarbon oil fraction log for the new wellbore comprises building a mud-gas hydrocarbon oil fraction database comprising historical data, training a machine learning model using the historical data in the mud-gas hydrocarbon oil fraction database, drilling a new wellbore, processing drilling mud returns, from the new wellbore, through a gas sampler comprising a gas chromatograph and a gas mass spectrometer, retrieving real-time mud-gas data from the gas sampler, and generating a real-time hydrocarbon oil fraction log for the new wellbore by processing the real-time mud-gas data through the trained machine learning model and producing estimated hydrocarbon oil fraction data.

Other aspects and advantages of the claimed subject matter will be apparent from the following description and the appended claims.

DETAILED DESCRIPTION

Figure 1:
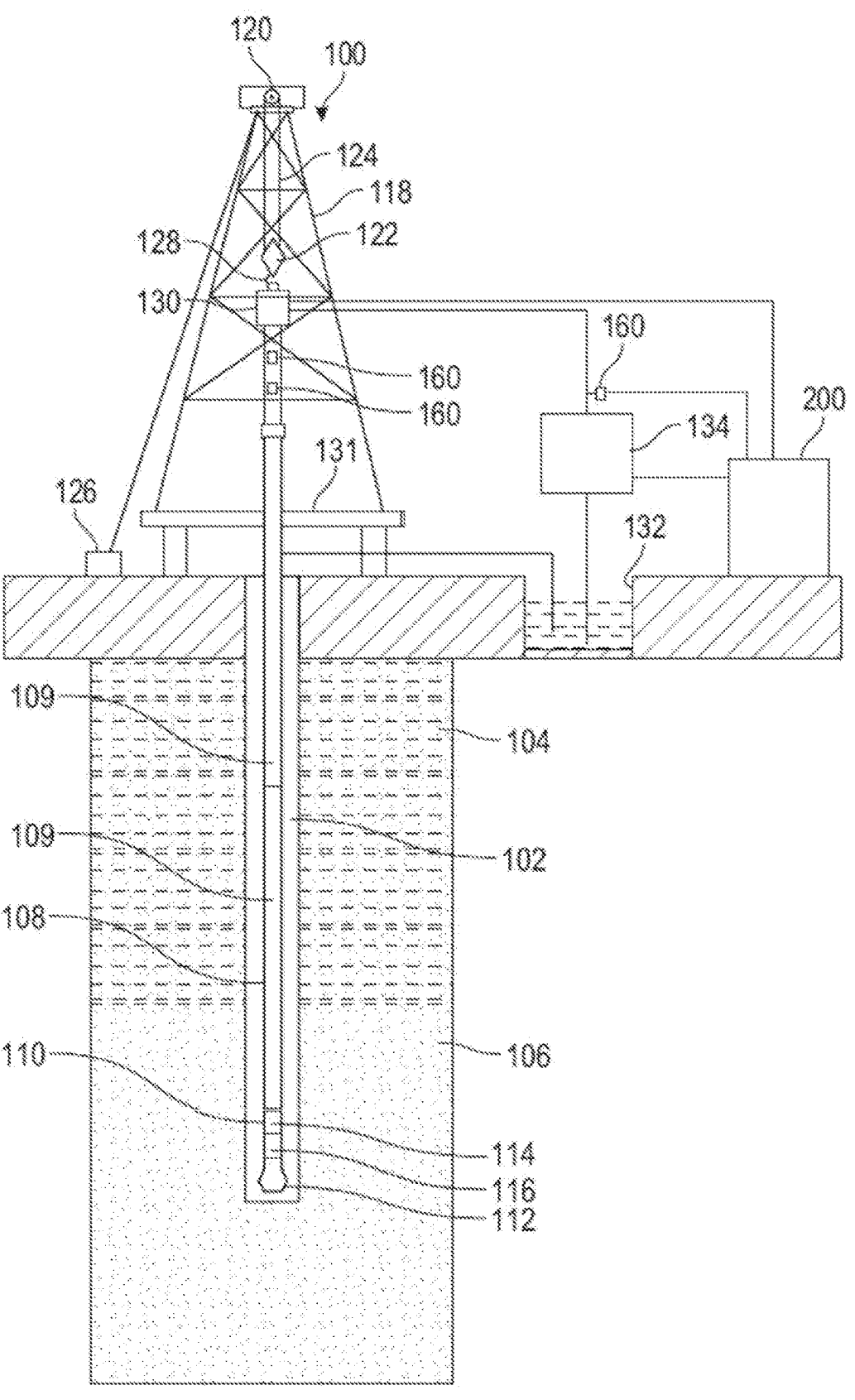
FIG. 1 is a schematic diagram of an exemplary well site in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Conventionally, the hydrocarbon oil fraction is derived from the analysis of well logs and fluid samples. Well logs are created by logging tools that are tripped into and out of a wellbore, by wireline, after the wellbore has already been drilled. Newer technologies allow for logs to be created during drilling operations by utilizing logging while drilling (LWD) equipment, however, LWD equipment often produces low quality well logs or lack thereof due to tool failure or bad borehole conditions. The ability to estimate the hydrocarbon oil fraction while drilling a well, without depending on well logs or fluid samples, will optimize drilling operations.

Machine learning (ML) provides the opportunity to take inputs, such as mud-gas data, and produce outputs, such as the hydrocarbon oil fraction. Machine learning is an application of artificial intelligence that allows systems to automatically learn and improve from experience without being explicitly programmed to do so. In this case, a machine learning algorithm finds a non-linear relationship between historical mud-gas data and their associated historical hydrocarbon oil fraction data. The algorithm uses this relationship to analyze new mud-gas data, with unknown hydrocarbon oil fraction values, and estimate the associated hydrocarbon oil fraction, while drilling, without relying on logs or fluid samples.

In practice, mud-gas data is used in association with formation logging when correlating a well to geological or petrophysical information, evaluation of wells, and formation fluid typing. Light gas (C1 to C5) is known to predict reservoir fluid types using pressure-volume-temperature (PVT) data, but the usage of mud-gas (light and heavy) data, along with machine learning models, to estimate the hydrocarbon oil fraction, while drilling, is novel and is outlined in the below disclosure.

FIG. 1 illustrates an exemplary well site (100). In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). For the purpose of drilling a new section of wellbore (102), a drill string (108) is suspended within the wellbore (102). The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that may be used to adjust the length of the cable (124) so that the traveling block (122) may move up or down the derrick (118). The traveling block (122) may include a hook (128) on which a top drive (130) is supported. The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (200) may be disposed at or communicate with the well site (100). System (200) may control at least a portion of a drilling operation at the well site (100) by providing controls to various components of the drilling operation. In one or more embodiments, system (200) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation). Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108). The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (200).

Figure 2:
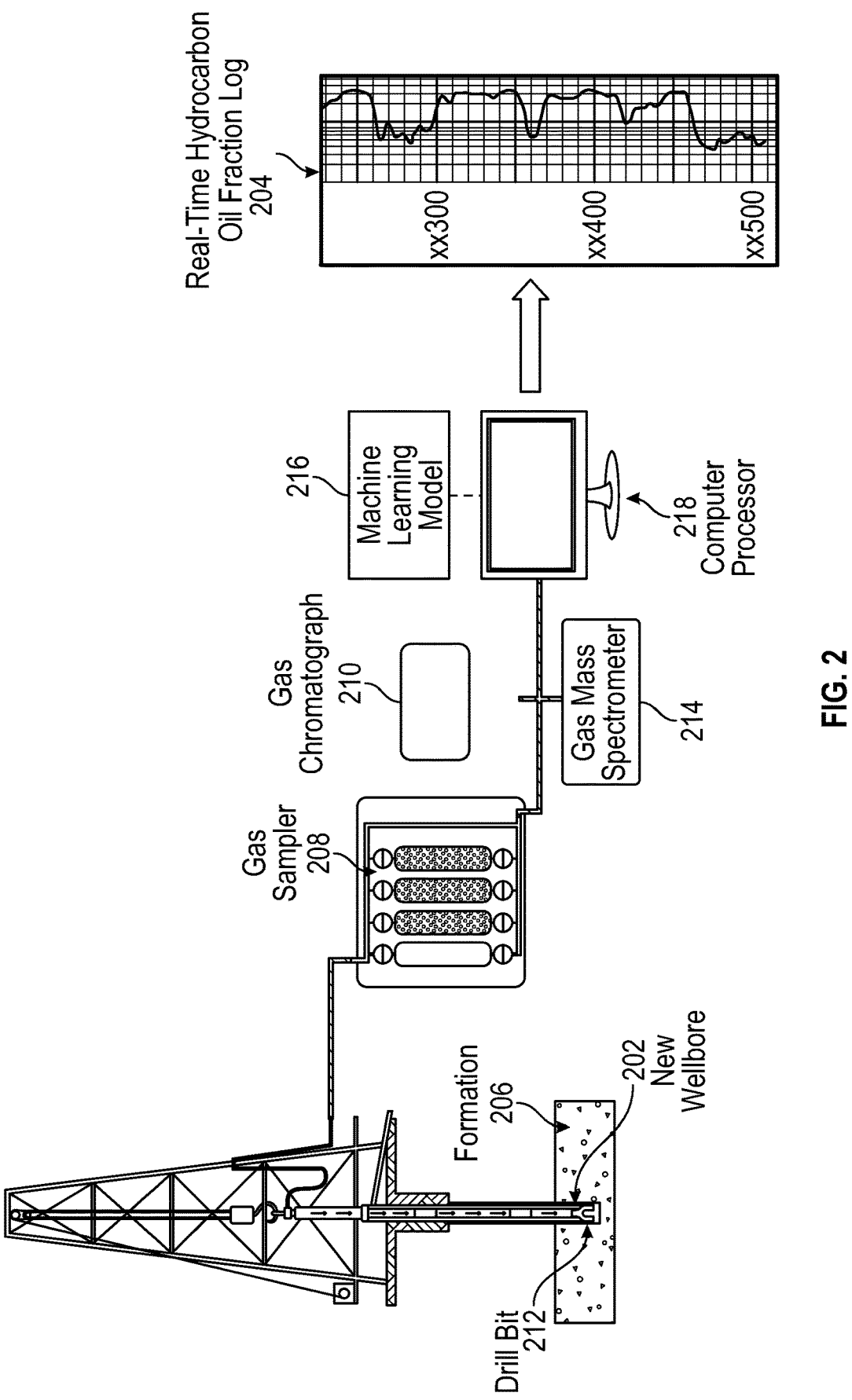
FIG. 2 is a schematic diagram of a hydrocarbon oil fraction prediction system in accordance with one or more embodiments.

FIG. 2 shows a schematic diagram in accordance with one or more embodiments. More specifically, FIG. 2 depicts a system for producing a real-time hydrocarbon oil fraction log (204) of a new wellbore (202) while the new wellbore (202) is being drilled. In one or more embodiments, a new wellbore (202) is drilled by a drill bit (212). As the drill bit (212) breaks down the formation (206), gas, from the formation (206), enters the drilling mud. When the drilling mud returns to the surface, it enters the mud system surface equipment such as a mud pit (132) or a mud-gas separator. The mud system surface equipment may further include a mud pit (132) with a de-gasser. The de-gasser is a stirring device that causes the trapped gas to escape from the drilling mud. A gas sampler (208) is attached to an outlet that conveys the gas liberated from the drilling mud, and the gas sampler (208) pulls a sample of the gas liberated from the mud pit. The sample of gas is analyzed using a gas chromatograph (210) and a gas mass spectrometer (214) to gather real-time mud-gas data. The gas chromatograph (210) is an analytical instrument that measures the content of light gases in the gas sample. Light gases are defined as gases having one carbon to gases having 5 carbons (C1-C5). The gas mass spectrometer (214) measures the content of heavy gases in the gas sample. Heavy gases are defined as gases having more than 5 carbons (C5+). The content of light and heavy gases per depth makes up the real-time mud-gas data.

The real-time mud gas data is processed through a machine learning model (216) to produce estimated hydrocarbon oil fraction data. The estimated hydrocarbon oil fraction data per depth makes up the real-time hydrocarbon oil fraction log (204). However, with reduction in hydrocarbon density and increase of gas components, the estimation accuracy drops due to variation in mud-gas response. The machine learning model (216) may be stored in a memory of a computer processor (218). The machine learning model (216) is any machine learning algorithm that has the ability to find a non-linear relationship between historical mud-gas data and their associated historical hydrocarbon oil fraction data and has the ability to use the relationship to process real-time mud-gas data and determine estimated hydrocarbon oil fraction data. Types of machine learning algorithms that may be used herein include, but are not limited to, Artificial Neural Networks, Support Vector Machines, Regression Tree, Random Forest, Extreme Learning Machine, Type I Fuzzy Logic, and Type II Fuzzy Logic.

Figure 3:
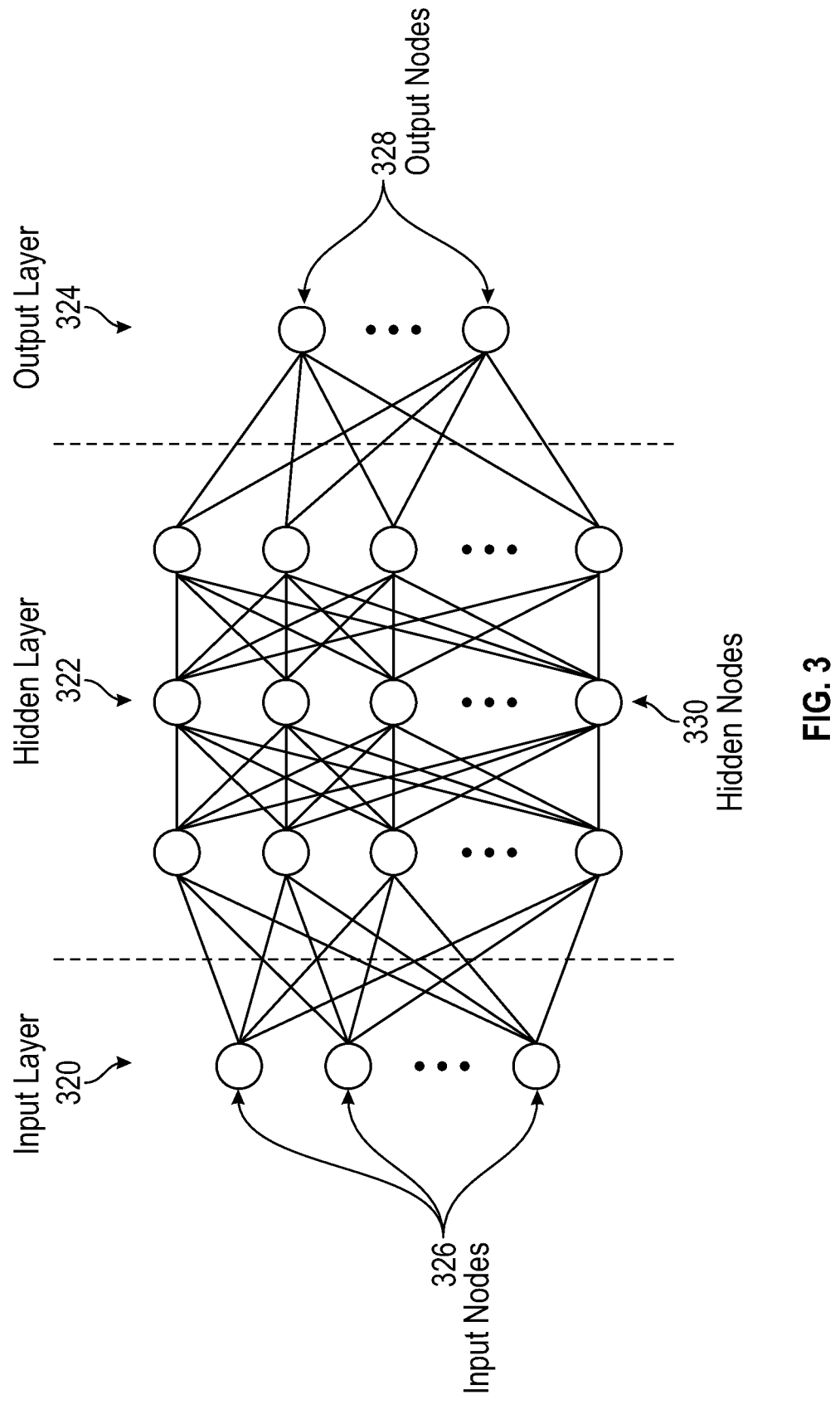
FIG. 3 is a schematic diagram of a machine learning model visualization in accordance with one or more embodiments.

FIG. 3 depicts a visualization of an Artificial Neural Networks (ANN) model, which is one example of a type of ML algorithm (216) that may be used to determine estimated hydrocarbon oil fraction data. The ANN model is designed to work similarly to the human brain comprising a number of simple, highly interconnected processing elements. The ANN model comprises an input layer (320) an output layer (324) and at least one hidden layer (322). The primary purpose of the ANN model is to transform inputs into valuable outputs. Information within the ANN model flows in two paths: feedforward networks and feedback networks.

In feedforward networks, the signals only travel in one direction (from inputs to outputs) without any loop. This type of network is used extensively for pattern recognition and only has one input layer (320), one output layer (324), and zero to multiple hidden layers (322). The feedforward network acts in two designs or phases. The first phase occurs when the algorithm is learning or being "trained". The second phase occurs when the algorithm is operating normally or "after being trained". The feedback network acts closer to the human brain such that this network uses their internal state or "memory" to process a sequence of inputs. Signals may travel in both directions with loops in the network.

The basic unit within the ANN model is called a neuron or node. The input nodes (326) within the input layer (320) are inputs from an external source. The output node (328) is based on the associated weight of the input node (326). Weights to the input nodes (326) are assigned based on their relative importance compared to the other input nodes (326). The hidden layer (322) is isolated from the external world. The purpose of the hidden layer (322) is to take input nodes (326) from the input layer (320) and perform the hidden layer's (322) job such as calculations and transformations from the input node (326) to the output node (328).

To create the ANN model, data is divided into two different subsets. The first data subset is the training subset, and the second data subset is the optimization subset. The first data subset is larger, by number of data points, than the second data subset. Commonly, the first data subset makes up 70% of the data points while the second data set makes up 30% of the data points. The first data subset allows the ANN model to understand and determine the various weights between the nodes. The second data subset minimizes a margin of error between the known outputs and the output nodes (328) produced by the ANN model.

For the purposes of this disclosure, the data used to train and optimize the ANN model comes from an integrated mud-gas hydrocarbon oil fraction database comprising historical data. This historical data comprises data such as historical mud-gas data, historical hydrocarbon oil fraction data, drilling parameters, well logs, critical categorical predictors, drilling fluid, etc. This mud-gas hydrocarbon oil fraction database is divided into a first data subset and a second data subset. The first data subset is used to train the ANN model. The ANN model produced from this first step of training/validating is called the trained model. Primarily, the ANN model utilizes the historical mud-gas data as the input nodes (326) and the historical hydrocarbon oil fraction data as the output nodes (328). The remainder of the data is used in the hidden layers (322) and hidden nodes (330) to determine a non-linear relationship between the historical mud-gas data and the historical hydrocarbon oil fraction data.

The mud-gas data, along with the other data that is in the mud-gas hydrocarbon oil fraction database, are obtained from already drilled and logged wells. Conventionally, a mud-gas measurement comes at a rate of every 1 foot. Each historical mud-gas measurement is paired to their corresponding historical hydrocarbon oil fraction measurement so the ANN model may determine the non-linear relationship.

The relationship is determined by multiplying each mud-gas measurement by a weight factor determined by the outcome of the nonlinear mapping using an appropriate activation function such as a Gaussian, sigmoid, polynomial, or tangential function. The weight factor commonly ranges from 0 to 1. The weight factor is obtained from the degree of nonlinear correlation between the historical mud-gas data and the historical hydrocarbon oil fraction data. This weighting process determines the effect a particular mud-gas measurement has on the overall relationship. A learning rate is assigned to scale the magnitude of the weighting process. If the learning rate is too low, the training process will progress slowly, however, if the learning rate is too high undesirable divergent behavior may occur. A certain function, f such as a sigmoid is used to transform the input space to a high-dimensional nonlinear space to match the nature of the subsurface data. A non-linear relationship equation that may be used is shown below in Equation (1):

$$Y = f(a_1 X_1 + a_2 X_2 + \ldots + a_6 X_6) \qquad \text{Equation (1)}$$

In Equation (1) Y is the target variable (or output nodes (328)) such as the estimated hydrocarbon oil fraction, $a_1 \ldots a_6$ are the weighting factors, $X_1$-$X_6$ are the input variable (or input nodes (326)) such as the mud-gas measurements, and f is the activation function such as a Gaussian or sigmoid function. Equation (2), below, is an example of a Guassian function and equation (3), below, is an example of a sigmoid function. In both Equation (2) and Equation (3) x is the data from the well logs.

$$f(x) = e^{-x^2} \qquad \text{Equation (2)}$$

$$f(x) = \frac{1}{1 + e^{-x}} \qquad \text{Equation (3)}$$

The second data subset is used to optimize the ANN model to be able to accurately predict the estimated hydrocarbon oil fraction data from the real-time mud-gas data. Learning parameters such as the number of layers, the learning rate, the number of nodes, the activation function, and the weight factors are initially set to predetermined values to fit the non-linear relationship equation. The historical mud-gas data from the second data subset is processed through the ANN model as the input nodes (326) and the estimated hydrocarbon oil fraction data is produced as the output nodes (328).

The estimated hydrocarbon oil fraction data is compared to the historical hydrocarbon oil fraction data and an error is calculated. If the error is within a preset threshold then the ANN model is "optimized" and may be used during drilling to process real-time mud-gas data and produce accurate estimated hydrocarbon oil fraction data. If the error is outside of the preset threshold then the optimization method is repeated using different learning parameters until the error is either within the preset threshold or a maximum number of iterations is reached and the learning parameters that produced an error closest to the preset threshold are selected.

After the ANN model has been optimized and is in use, further optimization may occur. When new mud-gas data and their corresponding hydrocarbon oil fractions from newly drilled and logged wells are available, this data may be added to the mud-gas hydrocarbon oil fraction database and the optimization process may be repeated to produce newer and more accurate learning parameters.

Figure 4:
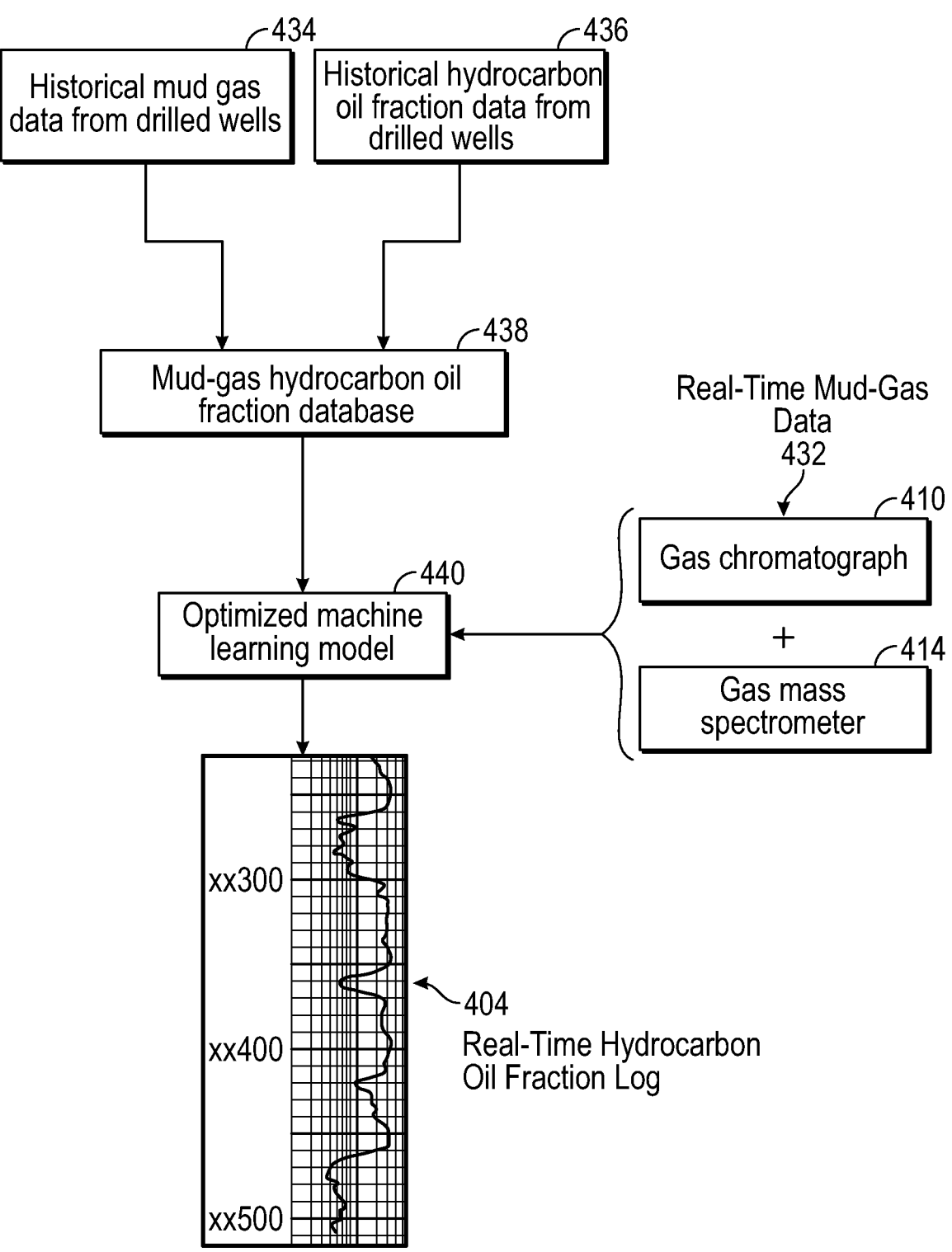
FIG. 4 shows a flow diagram in accordance with one or more embodiments.

FIG. 4 depicts a flow diagram illustrating the process used to produce a real-time hydrocarbon oil fraction log (404) from real-time mud gas data (432), in accordance with one or more embodiments. A mud-gas hydrocarbon database (438) is comprised of historical data such as historical mud-gas data (434), historical hydrocarbon oil fraction data (436), drilling parameters, well logs, critical categorical predictors, drilling fluid, etc. from previously drilled and logged wells. In one or more embodiments, this mud-gas hydrocarbon oil fraction database (438) is divided into a first data subset and a second data subset. The first data subset is used to train a machine learning model (216) to create a trained machine learning model (216). The second data subset is used to optimize the trained machine learning model (216) to create an optimized machine learning model (440). The first data subset and the second data subset may be unequal subsets. Further, the first data subset that is used for calibration (training) may be larger than the second data subset that is used for validation or optimization of the ML model. Those of ordinary skill in the art will appreciate that the data in the mud-gas hydrocarbon database may also be used as one undivided set to train the ML model and to optimize the trained ML model, without departing from the scope disclosed herein.

The machine learning model (216) may be an ANN model and the model may be trained and optimized as disclosed previously, or the machine learning model (216) may be any machine learning model (216) that has the ability to find a non-linear relationship between historical mud-gas data (434) and their associated historical hydrocarbon oil fraction data (436) and has the ability to use the relationship to process real-time mud-gas data (432) to create a real-time hydrocarbon oil fraction log (404). Types of machine learning models (216) that may be used herein include, but are not limited to, Artificial Neural Networks, Support Vector Machines, Regression Tree, Random Forest, Extreme Learning Machine, Type I Fuzzy Logic, and Type II Fuzzy Logic.

During a drilling operation, real-time mud-gas data (432) may be gathered from drilling mud returns. Gas samples are taken from the drilling mud returns and analyzed by a gas chromatograph (410) and a gas mass spectrometer (414). The gas chromatograph (410) measures the content of light gases in the gas sample. The gas mass spectrometer (414) measures the content of heavy gases in the gas sample. The content of light and heavy gases makes up the real-time mud-gas data (432). The real-time mud-gas data (432) is processed through the optimized machine learning model (440) to produce estimated hydrocarbon oil fraction data.

The estimated hydrocarbon oil fraction data per depth drilled makes up the real-time hydrocarbon oil fraction log (404). The real-time hydrocarbon oil fraction log (404) is a key input to subsequent reservoir characterization processes such as resolving issues with transition zones and low resistivity pay reservoirs. The estimated hydrocarbon oil fraction data predicted using this process may be used to delineate pay zones and identify fluid contacts. The estimated hydrocarbon oil fraction data may also be used to identify intervals of fractional flow production in transition zone reservoirs, low permeability formations, and dry oil production in low resistivity pay cases.

Figure 5:
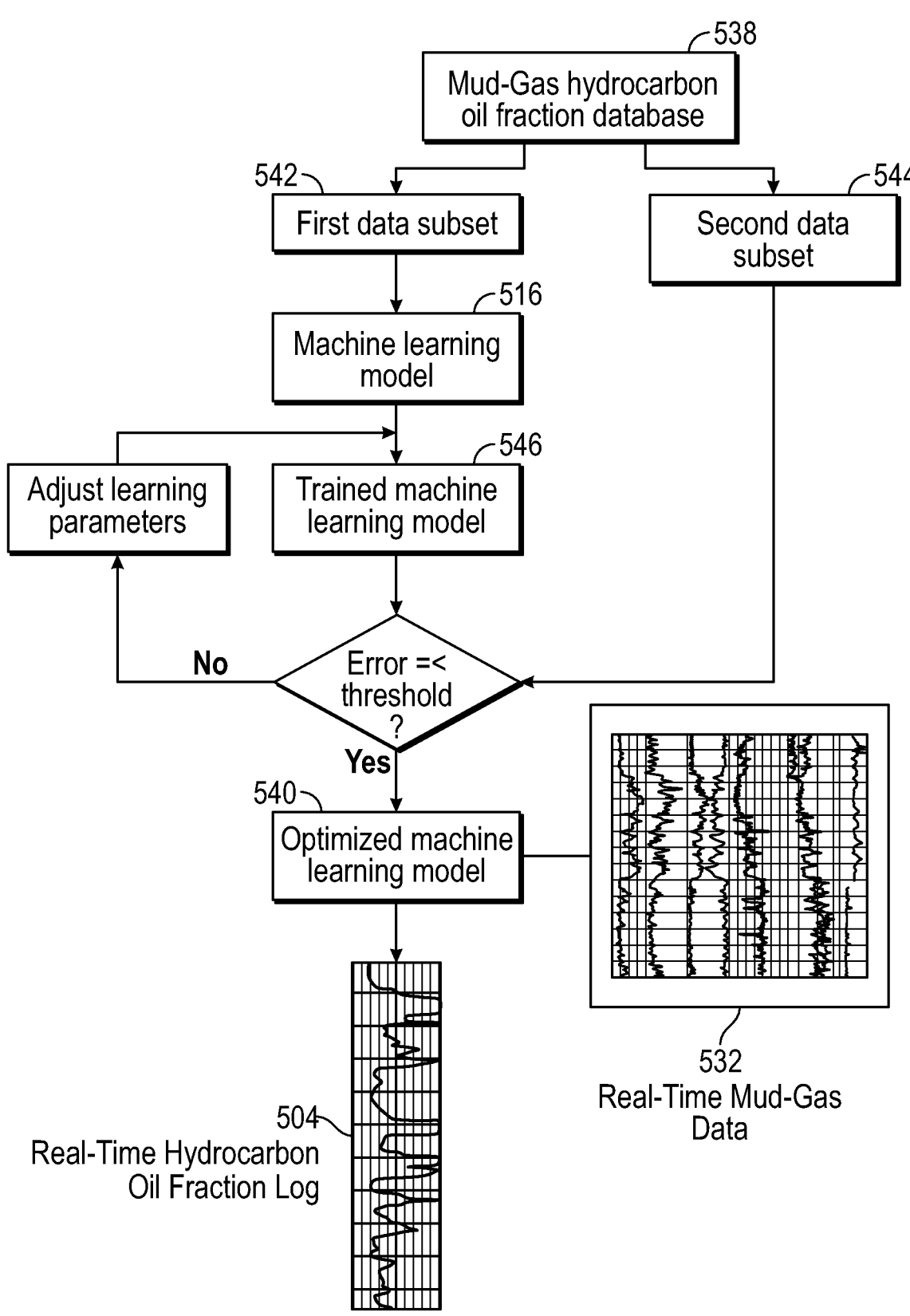
FIG. 5 shows a flow diagram in accordance with one or more embodiments.

FIG. 5 depicts a flow diagram illustrating the process used to train and optimize a machine learning model (516) to produce an accurate real-time hydrocarbon oil fraction log (504), in accordance with one or more embodiments. Types of machine learning models (516) that may be used herein include, but are not limited to, Artificial Neural Networks, Support Vector Machines, Regression Tree, Random Forest, Extreme Learning Machine, Type I Fuzzy Logic, and Type II Fuzzy Logic. The machine learning model (516) specifically depicted in FIG. 5 is the Artificial Neural Networks model.

A mud-gas hydrocarbon database (538) comprising historical data such as historical mud-gas data (434), historical hydrocarbon oil fraction data (436), drilling parameters, well logs, critical categorical predictors, drilling fluid, etc. from previously drilled and logged wells is divided into a first data subset (542) and a second data subset (544). The first data subset (542) and the second data subset (544) may be unequal in size, and the first data subset (542) may make up 70% of the data points while the second data subset (544) may make up 30% of the data points. In further embodiments, the first data subset (542) may be a data set obtained from a group of wells while the second data set (544) may be another data set obtained from a singular well reserved to test the trained model.

The first data subset (542) is used to train the machine learning model (516). The machine learning model (516) produced from this first step of training is called the trained machine learning model (546). Primarily, the machine learning model (516) utilizes the historical mud-gas data (434) as the input nodes (326) and the historical hydrocarbon oil fraction data (436) as the output nodes (328). The remainder of the data is used in the hidden layers (322) and hidden nodes (330) to determine a non-linear relationship between the historical mud-gas data (434) and the historical hydrocarbon oil fraction data (436).

The second data subset (544) is used to optimize the trained machine learning model (546) to be able to accurately predict the estimated hydrocarbon oil fraction data from real-time mud-gas data (532). Learning parameters such as the number of layers, the learning rate, the number of nodes, the activation function, and the weight factors are initially set to predetermined values to fit the non-linear relationship equation. The historical mud-gas data (434) from the second data subset (544) is processed through the trained machine learning model (546) as the input nodes (326) and the estimated hydrocarbon oil fraction data is produced as the output nodes (328).

The estimated hydrocarbon oil fraction data is compared to the historical hydrocarbon oil fraction data (436) and an error is calculated. If the error is within a preset threshold then the trained machine learning model (546) is "optimized" and may be used during drilling to process real-time mud-gas data (532) and produce accurate estimated hydrocarbon oil fraction data. If the error is outside of the preset threshold then the optimization method is repeated using different learning parameters until the error is either within the preset threshold or a maximum number of iterations is reached and the learning parameters that produced an error closest to the preset threshold are selected. With the proper learning parameters selected, the trained machine learning model (546) is now the optimized machine learning model (540). The optimized machine learning model (540) processes the real-time mud-gas data (532), gathered during drilling operations, to produce estimated hydrocarbon oil fraction data. The estimated hydrocarbon oil fraction data per depth makes up the real-time hydrocarbon oil fraction log (504).

Figure 6:
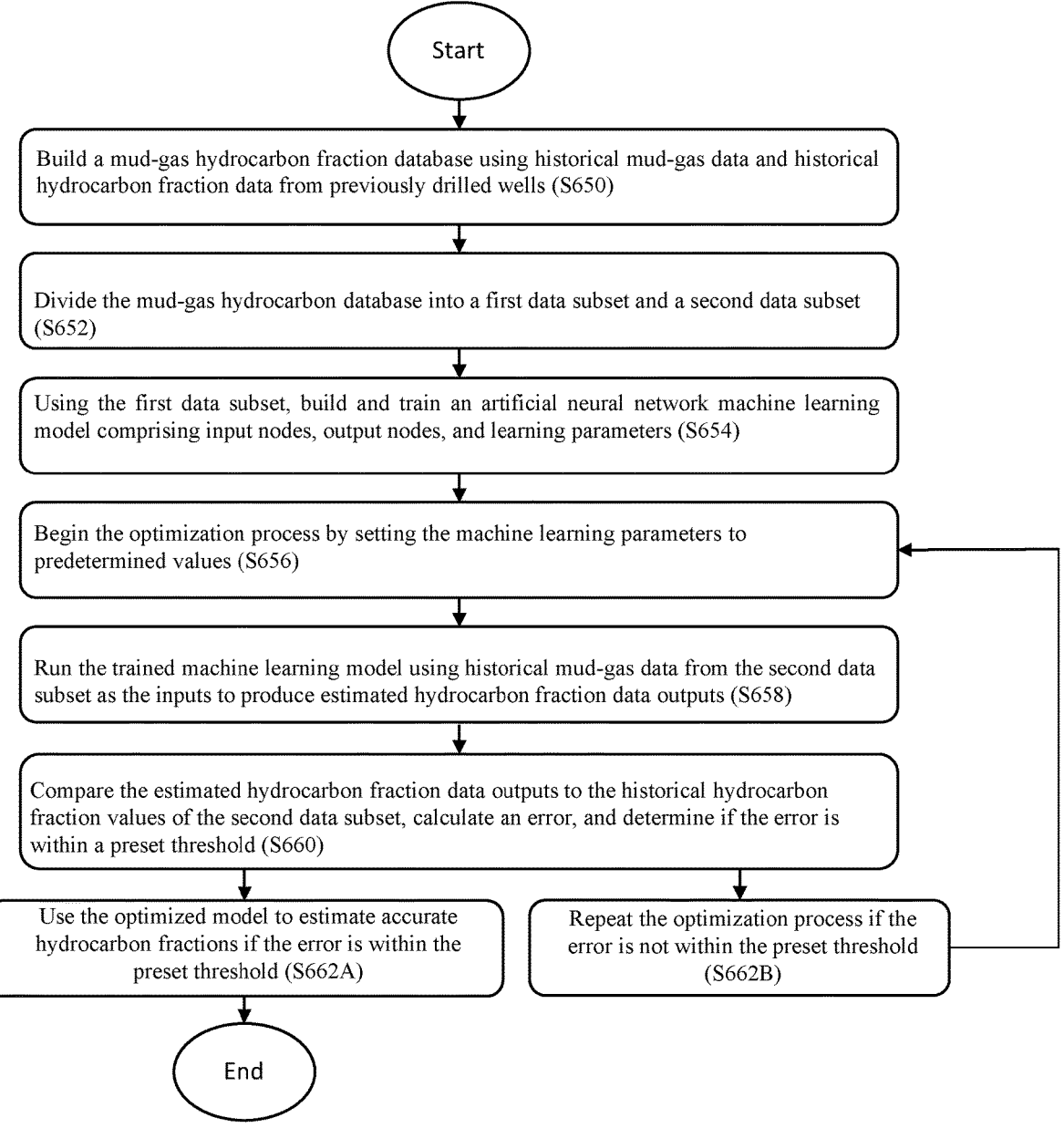
FIG. 6 shows a flowchart in accordance with one or more embodiments.

FIG. 6 shows a flowchart depicting steps that may be performed to train and optimize a machine learning model (216, 516) in accordance with one or more embodiments. A mud-gas hydrocarbon oil fraction database (438, 538) is built using historical data comprising historical mud-gas data (434) that corresponds to historical hydrocarbon oil fraction data (436) from previously drilled and logged wells (S650). The mud-gas hydrocarbon oil fraction database (438, 538) further comprises drilling parameters, well logs, critical categorical predictors, drilling fluid, etc.

The mud-gas hydrocarbon database (438, 538) is divided into a first data subset (542) and a second data subset (544) (S652). The first data subset (542) and the second data subset (544) may be unequal in size, and the first data subset (542) may make up 70% of the data points while the second data subset (544) may make up 30% of the data points. The first data subset (542) is used build and train an artificial neural networks (ANN) machine learning model (216, 516) comprising input nodes (326), output nodes (328), and learning parameters (S654).

The ANN machine learning model (216, 516) is trained by utilizing the historical mud-gas data (434) as the input nodes (326) and the historical hydrocarbon oil fraction data (436) as the output nodes (328). The remainder of the data is used in the hidden layers (322) and hidden nodes (330) to determine a non-linear relationship between the historical mud-gas data (434) and the historical hydrocarbon oil fraction data (436). Once the relationship between the historical mud-gas data (434) and the historical hydrocarbon oil fraction data (436) is determined, the ANN machine learning model (216, 516) is called the trained machine learning model (546) and may be optimized.

The optimization process begins by setting the learning parameters to predetermined values (S656) and running the trained machine learning model (546) using the historical mud-gas data (434) from the second data subset (544) as the input nodes (326) to produce estimated hydrocarbon oil fraction data output nodes (328) (S658). The estimated hydrocarbon oil fraction data is compared to the historical hydrocarbon data (436) of the second data subset (544) and an error is calculated and determined to be within a preset threshold (S660).

If the error is within the preset threshold, then the trained machine learning model (546) is optimized and is called the optimized machine learning model (440, 540). The optimized machine learning model (440, 540) may be used during drilling operations to process real-time mud-gas data (432, 532) and produce accurate estimated hydrocarbon oil fraction data (S662A). If the error is not within the preset threshold, then the optimization process is repeated (S662B) using different learning parameters until the error is either within the preset threshold or a maximum number of iterations is reached and the learning parameters that produced an error closest to the preset threshold are selected.

Figure 7:
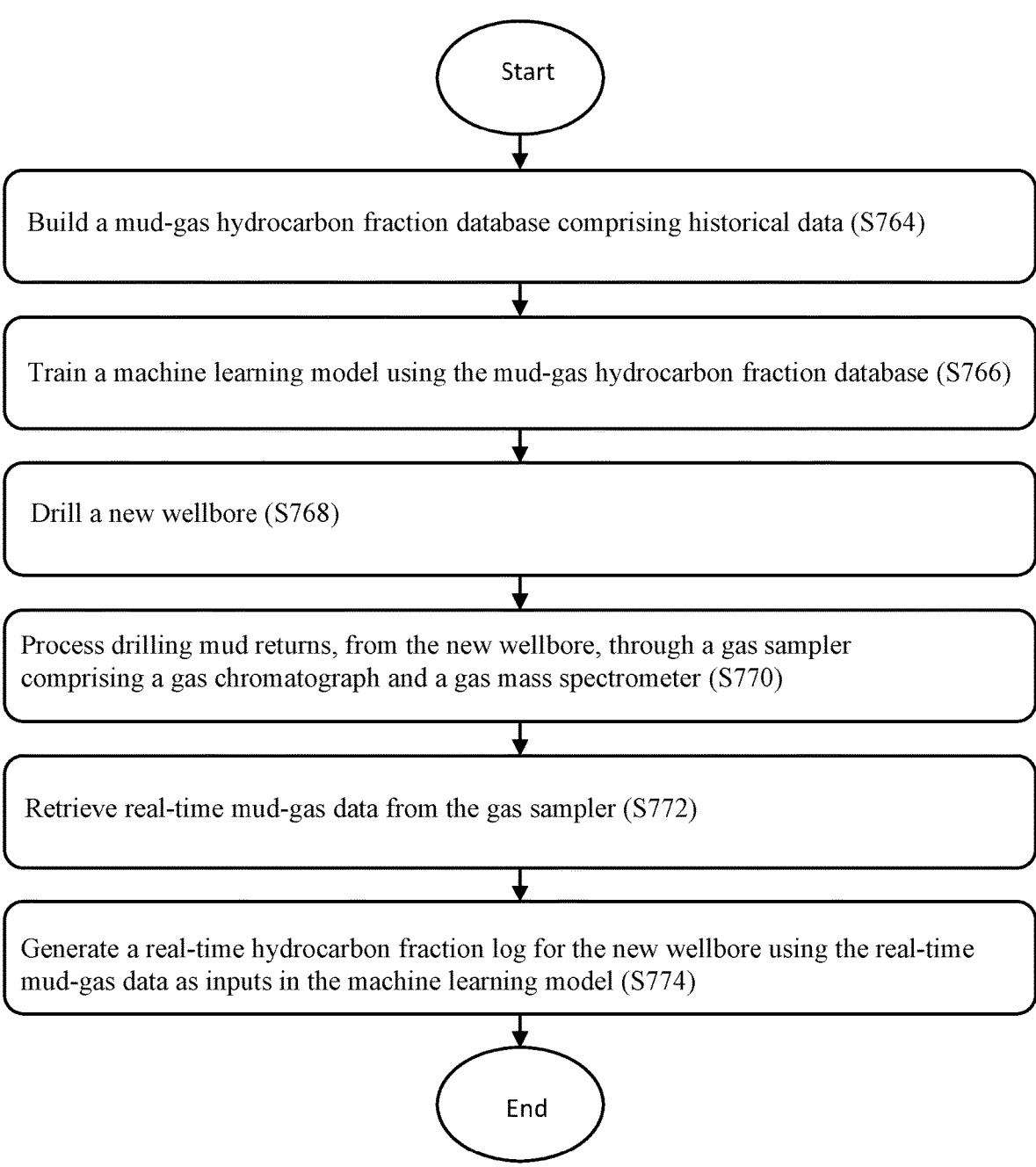
FIG. 7 shows a flowchart in accordance with one or more embodiments.

FIG. 7 shows a flowchart depicting steps that may be performed to produce a real-time hydrocarbon oil fraction log (204, 404, 504) for a new wellbore (102, 202) using real-time mud-gas data (432, 532). A mud-gas hydrocarbon oil fraction database (438, 538) is built using historical data comprising historical mud-gas data (434) that corresponds to historical hydrocarbon oil fraction data (436) from previously drilled and logged wells (S764). The mud-gas hydrocarbon oil fraction database (438, 538) further comprises drilling parameters, well logs, critical categorical predictors, drilling fluid, etc.

A machine learning model (216, 516) is trained using the mud-gas hydrocarbon oil fraction database (438, 538) (S766). The machine learning model (216, 516) that may be used may be Artificial Neural Networks, Support Vector Machines, Regression Tree, Random Forest, Extreme Learning Machine, Type I Fuzzy Logic, and Type II Fuzzy Logic or any model that has the ability to find a non-linear relationship between the historical mud-gas data (434) and their associated historical hydrocarbon oil fraction data (436), and the ability to use the relationship to process real-time mud-gas data (432, 532) and determine estimated hydrocarbon oil fraction data.

A new wellbore (102, 202) is drilled (S768) and the drilling mud returns are processed through a gas sampler (208) comprising a gas chromatograph (210, 410) and a gas mass spectrometer (214, 414) (S770) to retrieve real-time mud-gas data (432, 532) (S772). The real-time mud-gas data (432, 532) is processed through the optimized machine learning model (440, 540) and accurate estimated hydrocarbon oil fraction data is determined. A real-time hydrocarbon oil fraction log (204, 404, 504) is produced by plotting the estimated hydrocarbon oil fraction data per depth drilled (S774).

Figure 8B:
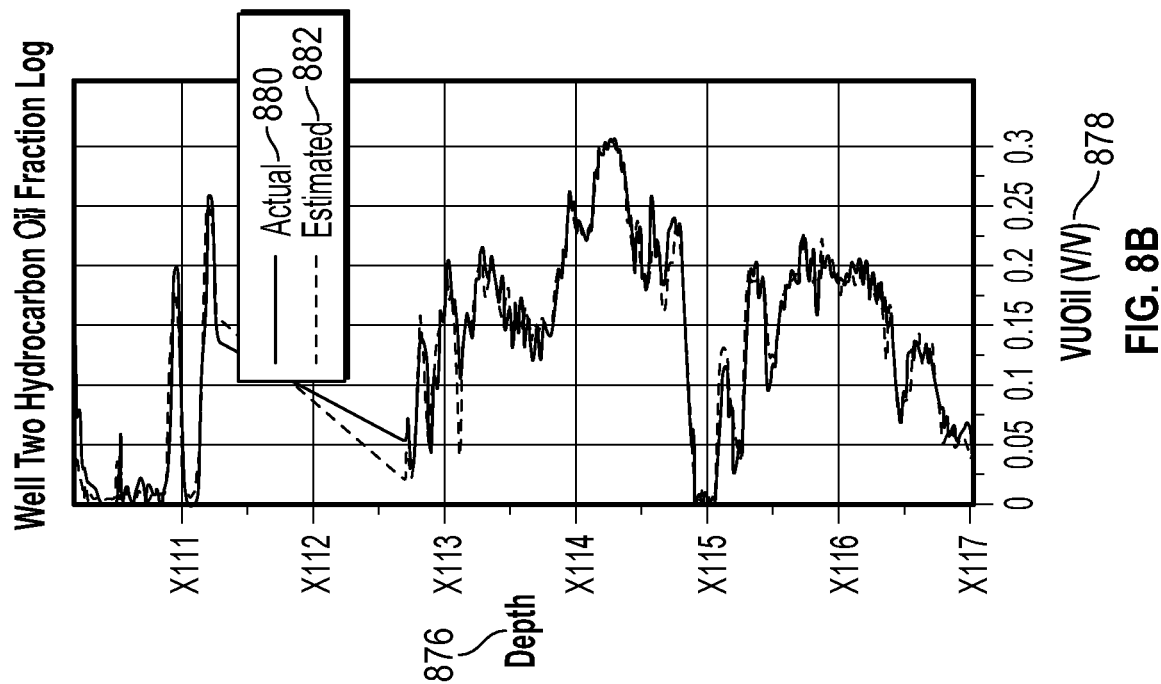
FIGS. 8A and 8B show well logs in accordance with one or more embodiments.
Figure 8A:
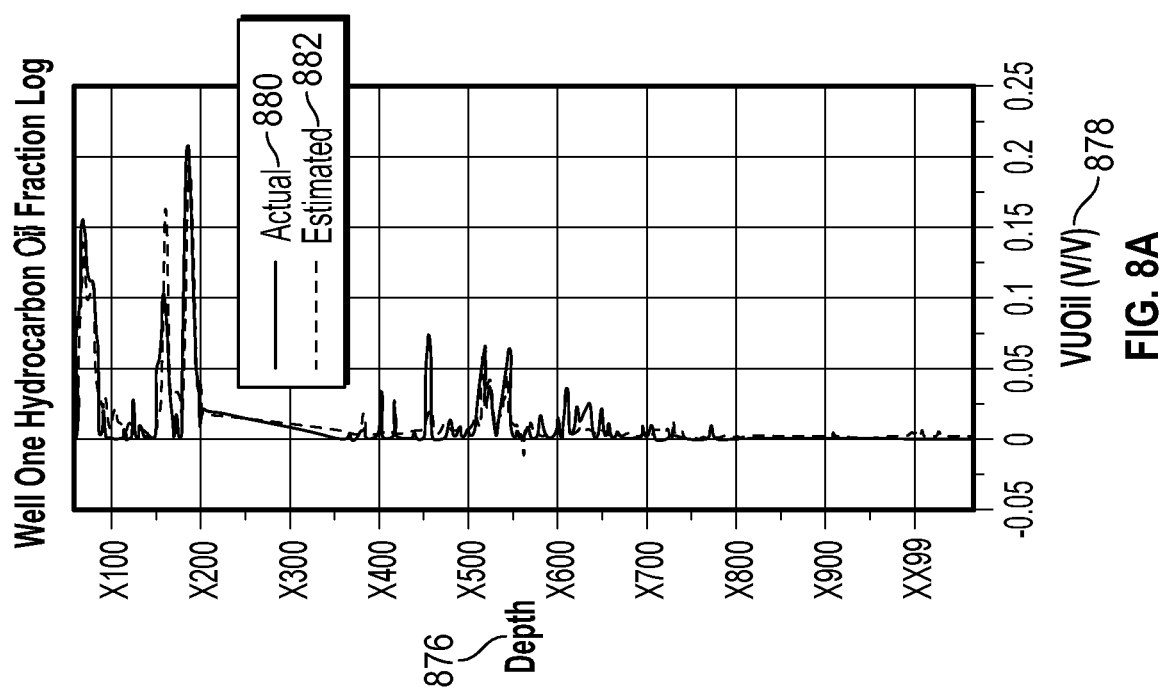

FIGS. 8A and 8B depict hydrocarbon oil fraction logs. FIG. 8A depicts depth (876) drilled (in feet) on the y-axis and the hydrocarbon oil fraction (878) (in a percent volume) on the x-axis for well A. The actual hydrocarbon oil fraction (880) and the estimated hydrocarbon oil fraction (882) determined by processing real-time mud-gas data (432, 532) through an optimized machine learning model (440, 550) are plotted on the graph to show the accuracy of the estimated hydrocarbon oil fraction (882) method. Further, FIG. 8B depicts depth (876) drilled (in feet) on the y-axis and the hydrocarbon oil fraction (878) (in a percent volume) on the x-axis for well B. The actual hydrocarbon oil fraction (880) and the estimated hydrocarbon oil fraction (882), determined by processing real-time mud-gas data (432, 532) through an optimized machine learning model (440, 540), are plotted on the graph to again show the accuracy of the estimated hydrocarbon oil fraction (882) method.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method comprising:

building a mud-gas hydrocarbon oil fraction database comprising historical data;

training a machine learning model using the historical data in the mud-gas hydrocarbon oil fraction database, the machine learning model being configured to:

receive, as input, mud-gas data associated with a drilling of a wellbore into a subsurface formation, the mud-gas data comprising a light gas content and a heavy gas content; and produce an estimated oil fraction of the subsurface formation by processing the light gas content and the heavy gas content;

drilling a new wellbore;

processing drilling mud returns, from the new wellbore, through a gas sampler comprising a gas chromatograph and a gas mass spectrometer;

retrieving real-time mud-gas data from the gas sampler;

generating a real-time hydrocarbon oil fraction log for the new wellbore, while drilling the new wellbore, by processing the real-time mud-gas data through the trained machine learning model; and making and executing a decision based on the real-time hydrocarbon oil fraction log while drilling the new wellbore, wherein the decision is selected from a group consisting of: extending the new wellbore to deeper depths, selecting a direction in which to drill the new wellbore, completing the new wellbore, and logging the new wellbore.

2. The method of claim 1, wherein the machine learning model comprises an algorithm selected from a group consisting of: Artificial Neural Networks, Support Vector Machines, Regression Tree, Random Forest, Extreme Learning Machine, Type I Fuzzy Logic, and Type II Fuzzy Logic.

3. The method of claim 1, wherein:

the gas chromatograph measures a real-time light gas content;

the gas mass spectrometer measures a real-time heavy gas content; and the real-time mud-gas data comprise the real-time light gas content and the real-time heavy gas content.

4. The method of claim 2, wherein the historical data comprises historical mud-gas data that corresponds to historical hydrocarbon oil fraction data derived from logs of previously drilled and logged wells.

5. The method of claim 4, wherein the machine learning model is the Artificial Neural Networks algorithm and the mud-gas hydrocarbon oil fraction database further comprises a first data subset and a second data subset, wherein the first data subset is used to train the machine learning model such that the machine learning model creates a nonlinear mathematical relationship between the historical mud-gas data and the historical hydrocarbon oil fraction data, and wherein the second data subset is used for optimizing the machine learning model such that the machine learning model accurately predicts the estimated hydrocarbon oil fraction data.

6. The method of claim 5, wherein the first data subset and the second data subset are unequal, and the first data subset is larger, by number of data points, than the second data subset.

7. A system comprising:

a machine learning model configured to:

receive, as input, mud-gas data associated with a drilling of a wellbore into a subsurface formation, the mud-gas data comprising a light gas content and a heavy gas content; and produce an estimated oil fraction of the subsurface formation by processing the light gas content and the heavy gas content;

a computer processor with a memory for storing the machine learning model; and a drilling system comprising:

a new wellbore;

drilling mud returns; and a gas sampler comprising a gas chromatograph and a gas mass spectrometer, wherein the drilling mud returns, from the new wellbore, are processed through the gas sampler, wherein the machine learning model is trained using a mud-gas hydrocarbon oil fraction database comprising historical data, wherein the computer processor retrieves real-time mud-gas data from the gas sampler and the machine learning model generates, using the real-time mud-gas data as input, a real-time hydrocarbon oil fraction log for the new wellbore as the new wellbore is being drilled, and wherein a decision based on the real-time hydrocarbon oil fraction log is determined and executed while drilling the new wellbore and the decision is selected from a group consisting of: extending the new wellbore to deeper depths, selecting a direction in which to drill the new wellbore, completing the new wellbore, and logging the new wellbore.

8. The system of claim 7, wherein the machine learning model comprises an algorithm selected from a group consisting of: Artificial Neural Networks, Support Vector Machines, Regression Tree, Random Forest, Extreme Learning Machine, Type I Fuzzy Logic, and Type II Fuzzy Logic.

9. The system of claim 7, wherein:

the gas chromatograph measures a real-time mud-gas data corresponding to light gases and light gas content;

the gas mass spectrometer measures a real-time mud-gas data corresponding to heavy gases heavy gas content; and the real-time mud-gas data comprise the real-time light gas content and the real-time heavy gas content.

10. The system of claim 8, wherein the historical data comprises historical mud-gas data that corresponds to historical hydrocarbon oil fraction data derived from logs of previously drilled and logged wells.

11. The system of claim 10, wherein the machine learning model is the Artificial Neural Networks algorithm and the mud-gas hydrocarbon oil fraction database further comprises a first data subset and a second data subset, wherein the first data subset is used to train the machine learning model such that the machine learning model creates a nonlinear mathematical relationship between the historical mud-gas data and the historical hydrocarbon oil fraction data, and wherein the second data subset is used for optimizing the machine learning model such that the machine learning model accurately predicts estimated hydrocarbon oil fraction data.

12. The system of claim 11, wherein the first data subset and the second data subset are unequal, and the first data subset is larger, by number of data points, than the second data subset.

\*  \*  \*  \*  \*